(12) United States Patent
Toyoda

(10) Patent No.: US 7,178,620 B2
(45) Date of Patent: Feb. 20, 2007

(54) SWINGARM SUSPENSION SYSTEM FOR VEHICLE

(75) Inventor: Hidetoshi Toyoda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 232 days.

(21) Appl. No.: 10/815,736

(22) Filed: Apr. 2, 2004

(65) Prior Publication Data

US 2004/0195799 A1 Oct. 7, 2004

(30) Foreign Application Priority Data

Apr. 4, 2003 (JP) ............................. 2003-102125

(51) Int. Cl.
*B62K 25/12* (2006.01)
(52) U.S. Cl. ...................... 180/227; 280/284
(58) Field of Classification Search ................ 280/283, 280/284, 285, 286; 180/227
See application file for complete search history.

(56) References Cited

U.S. PATENT DOCUMENTS

| | | | | |
|---|---|---|---|---|
| 1,047,430 A | * | 12/1912 | Michaelson | ................. 280/284 |
| 4,457,393 A | | 7/1984 | Tamaki et al. | |
| 4,529,056 A | * | 7/1985 | Kreuz | ........................ 180/227 |
| 4,556,119 A | * | 12/1985 | Shiratsuchi | ................. 180/219 |
| 4,596,302 A | * | 6/1986 | Suzuki et al. | ............... 180/227 |
| 4,621,706 A | * | 11/1986 | Boyesen | ..................... 180/227 |
| 4,744,434 A | * | 5/1988 | Miyakoshi et al. | ......... 180/219 |
| RE34,897 E | * | 4/1995 | Richardson et al. | ........ 180/227 |
| 6,481,523 B1 | * | 11/2002 | Noro et al. | ................. 180/227 |
| 6,581,711 B1 | * | 6/2003 | Tuluie | ........................ 180/227 |
| 6,595,310 B2 | * | 7/2003 | Gogo | ........................ 180/219 |

FOREIGN PATENT DOCUMENTS

| | | |
|---|---|---|
| EP | 1188657 A2 | 3/2002 |
| JP | 2002-68066 A | 3/2002 |

\* cited by examiner

*Primary Examiner*—Anne Marie Boehler
(74) *Attorney, Agent, or Firm*—Birch, Stewart, Kolasch & Birch, LLP

(57) ABSTRACT

A swingarm suspension system for a vehicle for reducing weight by reducing a load on a link mechanism and reducing a space in the vicinity of the center of the vehicle. A swingarm is attached to a vehicle body side pivot shaft with a shock absorber having a lower end attached to a lower part of the swingarm. A first link is attached to an upper end of the shock absorber and an upper part of the swingarm and a second link is attached to part of the vehicle body side lower down relative to the pivot shaft and the first link. An angle R formed by a first axis, constituting a swing radius of the first link, and a second axis, running along a tension direction of the second link, is set so as to pass through 90° while the shock absorber extends between maximum extension compression positions.

2 Claims, 6 Drawing Sheets

SWINGARM SUSPENSION SYSTEM FOR VEHICLE

BACKGROUND OF THE INVENTION

CROSS-REFERENCE TO RELATED APPLICATIONS

The present application claims priority under 35 USC 119 to Japanese Patent Application No. 2003-1021125 filed on Apr. 4, 2003 the entire contents thereof is hereby incorporated by reference.

1. Field of the Invention

This invention relates to a swingarm suspension system for a vehicle, provided with a swing arm supporting a vehicle wheel, and a shock absorber attached to this swingarm. More particularly, the present invention relates to an arrangement of a link mechanism attached to the swingarm and the shock absorber.

2. Description of Background Art

Conventionally, a swingarm suspension system for a vehicle includes a swingarm having a vehicle wheel supported on one end that is swingably attached at the other end to a vehicle body side pivot shaft. An upper end of a shock absorber is attached to this swingarm with a lower end of the shock absorber being attached to a first link connected to the swing arm and this first link is attached to a second link connected to a part of the vehicle body side pivot shaft further down than the pivot shaft. See, for example, Japanese Patent Laid-open Publication No. 2002-68066.

The prior devices makes it possible to do away with a cross member etc. from the vicinity of the vehicle center above the pivot shaft and to arrange electrical components etc. together by having an attachment of the shock absorber to the vehicle body side that is lower down than the pivot shaft. Also, by inputting a shock absorber load lower down than the vehicle body side pivot shaft, there is the advantage of providing a stable steering system and improving the operating performance.

With the above described swingarm suspension system, it is also possible to arrange the first link above the swingarm by causing the second link to extend to above the swingarm. In this way, it is possible to maintain a large ground clearance for the vehicle body. In addition, it is possible to prevent rainwater and mud etc. from affecting the first link. However, in the event that the first link is arranged above the swingarm, since a spatial relationship around the center of the vehicle above the pivot shaft and design freedom for a link mechanism made up of the respective links are limited, this invites an increase in load on the link mechanism, which as a result causes an increase in body weight. Therefore, the present invention is intended to reduce the weight by lightening the load on the link mechanism, and provides a swingarm suspension system for a vehicle that suppresses the effect on the space in the vicinity of the vehicle center.

SUMMARY AND OBJECTS OF THE INVENTION

As a means for solving the above described problems, the present invention provides a swingarm suspension system 20, 120 for a vehicle provided with a swingarm 21 having one end swingably attached to a pivot shaft 14 provided on a vehicle body side. A pivot plate 13 is provided together with a power unit 8. A vehicle rear wheel 22 is attached to another end with a shock absorber 23 having a lower end attached to a lower part of the swingarm. A first link 25, 125 is rotatably attached to an upper end of the shock absorber and an upper part of the swingarm with a second link 26 rotatably attached to part of the vehicle body side lower down than the pivot shaft and the first link. An angle R, R' is formed by a first axis 25A, 125A connecting respective centers of a rotational shaft 31 of the first link and the swing arm and a rotational shaft 33 of the first link and the second link, and a second axis 26A connecting respective centers of the rotational shaft of the first link and the second link and a rotational shaft 34 of the second link and the vehicle body side. The angle R, R' is set so as to pass through 90° while the shock absorber reaches from a maximum extension position to a maximum compression position.

According to this swingarm suspension system, while a lower end of the shock absorber attached to the swingarm is pressed upwardly for accompanying an upward swinging of the swingarm, the first link moves upwardly together with the swingarm and is pulled out by the second link attached to the vehicle body side, to swing the first link with respect to the swingarm and to press the upper end of the shock absorber downwardly. As a result, the shock absorber is compressed in a direction causing the upper and lower ends to come closer in a stroke direction.

At this time, a rotational shaft of the first link and the swingarm constitutes a center of oscillation of the first link, and a rotational shaft of the first link and the second link constitutes a power point. Also, a first axis, connecting respective centers of the rotational shaft of the first link and the swingarm and the rotational shaft of the first link and the second link, constitute a swing radius. The power point is pulled towards the vehicle body side by the second link. However, since an angle formed by a second axis, connecting respective centers of the rotational shaft of the second link and the first link and a rotational shaft of the second link and the vehicle body side, and a first axis which is the swing radius is set so as to pass through 90° while the shock absorber reaches from a maximum extension position to a maximum compression position, the second link always pulls the power point at an angle of about 90° with respect to the swing radius. As a result, when the first link is caused to swing, it is possible to minimize a load or tension applied to the second link.

The present invention includes a rotational shaft of the first link and the swingarm that is provided at a position overlapping the swingarm when viewed from the side.

According to this swingarm suspension system, it is possible to lower the position of the first link, and it is possible to ensure a wide space in the vicinity of the center of the vehicle above the pivot shaft. Also, it is possible to shorten the length of the second link by lowering the position of the first link.

The present invention includes the swingarm that is provided with a pair of mutually connected arm members 37 with reinforcement frames 38 being provided on lower parts of the arm members.

According to this swingarm suspension system, by providing the reinforcement frames on the lower parts of the arm members of the swingarm, it is possible to ensure a much wider space above the arm members. Also, by keeping the upper surface height of the swingarm low, it is possible to arrange respective connecting parts of the first link and of the second link and the shock absorber above the swingarm.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
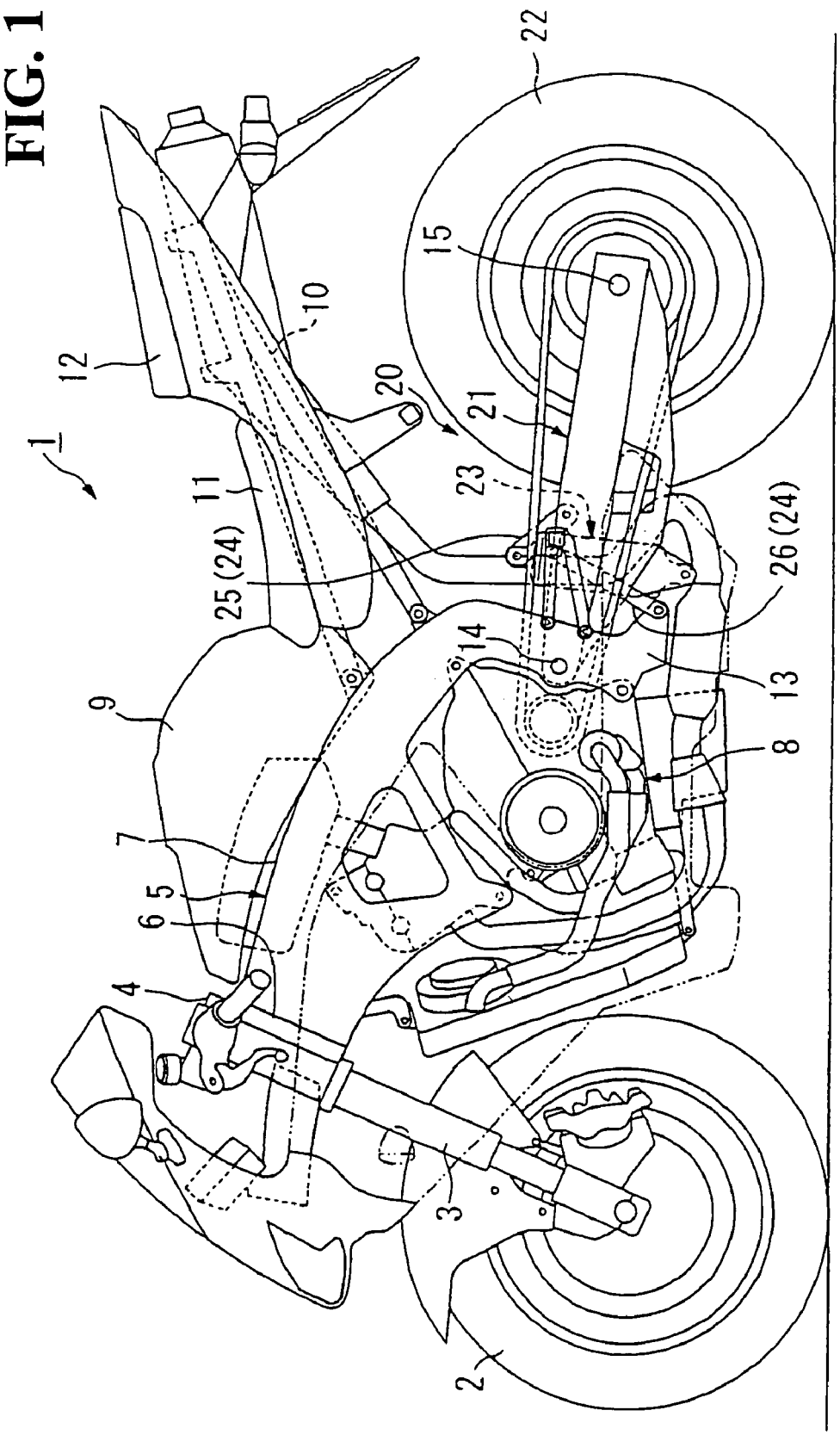
FIG. 1 is a side elevation of a motorcycle of embodiments of the present invention.

Embodiments of the invention will now be described with reference to the drawings wherein FIG. 1 is a side elevation of a motorcycle or vehicle provided with the swingarm suspension system of the present invention. As shown in FIG. 1, a front fork 3, axially supporting a front wheel 2 of a motorcycle 1, is attached in a steerable manner to a headpipe 6 of a vehicle frame 5, via a steering stem 4. A power unit 8 that includes an engine and a transmission is attached to a lower part of a main frame 7 of the vehicle frame 5. A fuel tank 9 is attached to an upper part of the main frame 7. A rider's seat 11 and pillion seat 12 for a rearwardly seated rider are respectively attached to an upper part of a seat rail 10 connected to a rear part of the main frame 7. The swingarm suspension system 20 of the present invention is attached to a pivot plate 13 linked to a rear end of the main frame 7.

The swingarm suspension system 20 comprises a swingarm 21 having a front end swingably attached to a pivot shaft 14 provided on the pivot plate 13, and a rear wheel 22 attached to a rear end. A shock absorber 23 is provided having a lower end swingably attached to a lower part of the swingarm 21 with a link mechanism 24 for attaching an upper end of the shock absorber 23 to a lower end of the pivot plate 13.

Also, the link mechanism 24 comprises a first link 25 rotatably attached to an upper end of the shock absorber 23 and to an upper part of the swingarm 21, and a second link 26 rotatably attached to a part of the pivot plate 13 lower down than the pivot shaft 14 and to the first link 25. By making the shock absorber 23 stroke so that the upper and lower ends of the shock absorber 23 move together and move apart, impacts transmitted from the rear wheel 22 and the swingarm 21 to the vehicle body side are absorbed. The pivot shaft 14 is provided in parallel with the width direction of the vehicle, the same as the axle or rear wheel axle 15 of the rear wheel 22.

Figure 2:
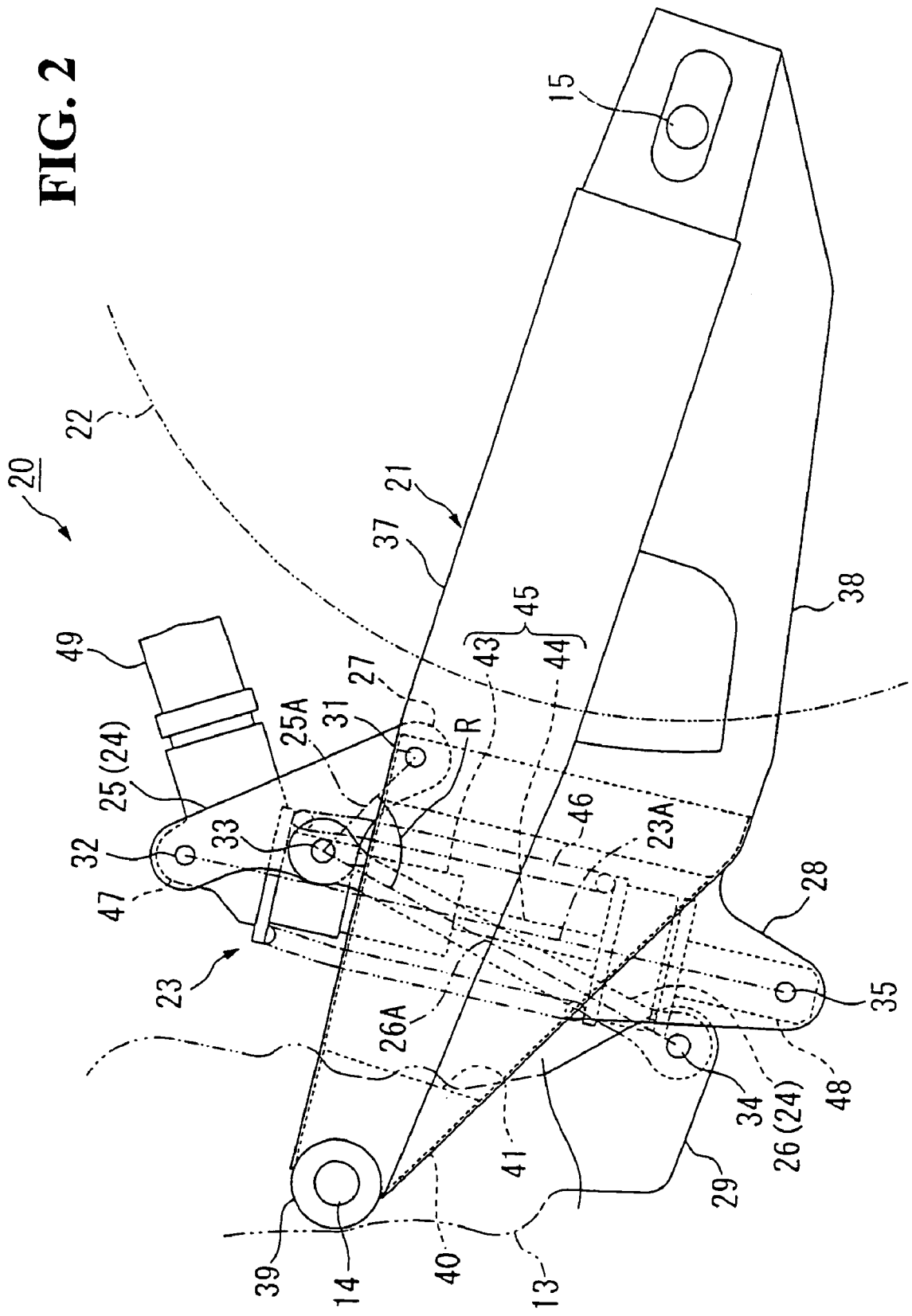
FIG. 2 is a side elevation of a swingarm suspension system according to a first embodiment.

As shown in FIG. 2, a rear end of the longitudinal first link 25 is rotatably connected to an upper connecting section 27 of the swingarm 21 using the first connecting shaft 31. Also, a front end section of the first link 25 and an upper end section of the shock absorber 23 are rotatably connected using a second connecting shaft 32. An upper end of the rod-shaped second link 26 is rotatably connected between front and rear ends of the first link 25 using a third connecting shaft 33. A lower end of the second link 26 is rotatably connected to a link attachment section 29 provided on a lower end of the pivot plate 13 using a fourth connecting shaft 34. A lower bracket 28 is provided on a lower part of the swingarm 21, and a lower end of the shock absorber 23 is connected to this lower bracket 28 using a fifth connecting shaft 35. Each of the connecting shafts 31–35 are provided parallel to the pivot shaft 14.

The swingarm 21 is provided with a pair of mutually connected arm members 37, 37, only one is shown in the drawings, with reinforcement frames 38 being provided on the lower parts of the arm members 37. The front ends of each arm member 37 are connected using a pivot pipe 39 extending in the width direction of the vehicle. Each arm member 37 and front sections of the reinforcement frames 38 are connected using a cross member 40 provided to the rear of the pivot pipe 39. An insertion hole 41 is formed in the cross member 40 running in a substantially vertical direction, with the shock absorber 23 and the second link 26 being arranged inside this insertion hole 41. The shock absorber 23 and second link 26, respectively, have upper ends arranged so as to project further upwardly relative to an upper surface of the swingarm 21, upper surface of the arm members 37, with lower ends arranged so as to project further downwardly relative to the lower surface of the swingarm 21, lower surface of the reinforcement frames 38.

The shock absorber 23 has a damper or attenuation unit 45 arranged so that with a cylinder 43 at an upper side, a piston rod 44 that is made to stroke together with a piston (not shown) inside the cylinder 43 is at a lower side. A suspension spring 46 is set so that there is a specified initial load across flange sections 43a, 44a respectively provided on an upper end of the cylinder 43 and a lower end of the piston rod 44. A connecting section 47 for connecting to the first link 25 is provided at an upper part of the cylinder 43, while a connecting section 48 for connecting to the lower bracket 28 is provided on a lower part of the piston rod 44. As the shock absorber 23 moves through its stroke these connecting sections 47 and 48 are brought close together, and then move apart. At this time, by also moving the damper 45 through its stroke at the same time, a damping force that is proportional to the stroke speed of the shock absorber 23 is generated. A reserve tank 49 of gas is filled inside the cylinder 43.

The connecting section 27 for the rear end of the first link 25 and the swingarm 21 is provided at a lower position than the upper surface of the swingarm 21, upper surface of the arm members 37. That is, the first connecting shaft 31 is provided at a position overlapping the swingarm 21 as seen from the side. Also, the lower bracket 28 is formed so as to protrude downwardly from the lower surface of the swingarm 21, and is arranged further to the rear than the link attachment section 29 when viewed from the side. The first link 25 is arranged between the connecting section 27 for the swingarm 21 and the upper end of the shock absorber 23, and an upper end of the second link 26 is connected to a substantially central part between the two end sections of the first link 25.

FIG. 2 shows the state where the shock absorber 23 of the swingarm suspension system 20 is at a maximum extension position, fully extended state. In this state, an angle R formed by a first axis 25A, connecting respective centers of the first connecting shaft 31, which is the rotational shaft of the first link 25 and the swingarm 21, and the third connecting shaft 33, which is the rotational shaft of the first link 25 and the second link 26 and a second axis 26A, connecting respective centers of the third connecting shaft 33 and the fourth connecting shaft 34, which is the rotational shaft of the second link 26 and the pivot plate 13, is an acute angle.

Also, the first link 25 is arranged at an inclined attitude so that the front side is positioned above, while the second link 26 is arranged at an inclined attitude so that the upper side is positioned to the rear. The shock absorber 23 is then arranged so that a longitudinal, expansion and contraction direction, axis 23A joining the centers of each of the connecting shafts 32 and 35 of the two ends of the shock absorber 23 is substantially vertical, that is the shock absorber 23 is arranged in a substantially upright state.

Next, the operation of the swingarm suspension system 20 of this embodiment will be described.

Figure 3:
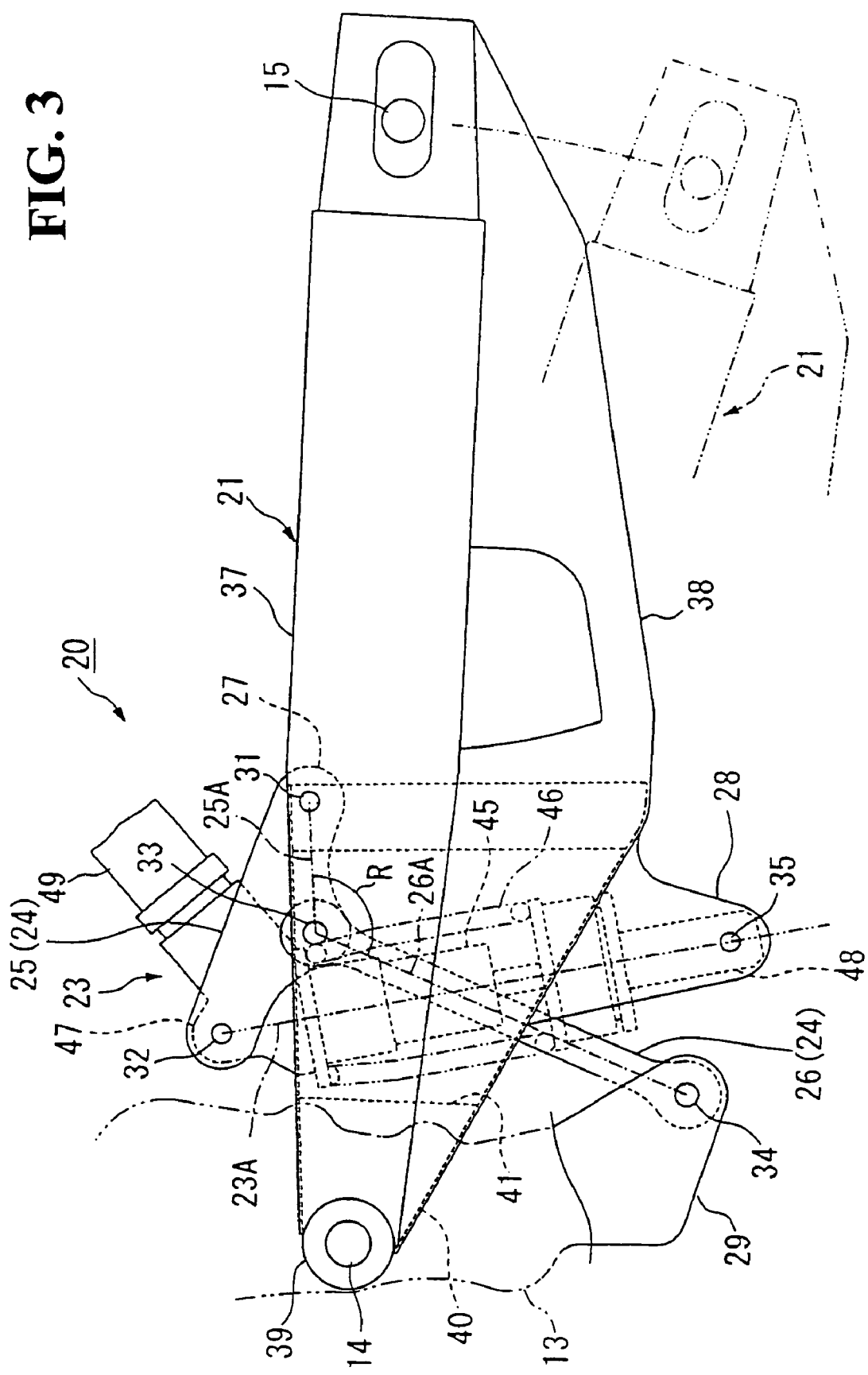
FIG. 3 is a side elevation showing the swingarm suspension system of FIG. 2 with a shock absorber in a fully retracted state.

FIG. 3 shows a state where the shock absorber 23 of the swingarm suspension system 20 is positioned at a maximum compression position, fully retracted state. The swingarm 21 is shown with broken lines in the drawing represents the position with the shock absorber 23 in the fully extended state, the position of FIG. 2. As shown in FIG. 3, if the swingarm 21 swings in a direction causing the rear wheel 22 to move upwardly with respect to the vehicle body side, vehicle frame 5 and power unit 8, with the pivot shaft 14 as a center, the connecting section 27 and the lower bracket 28 move upwardly along an arc with the pivot shaft 14 as a center, together with the swingarm 21. At this time, the rear end of the first link 25 that is connected to the connecting section 27 also moves upwardly. However, a substantially central part between the two ends of the first link 25 is connected to the upper end of the second link 26 and since a lower end of the second link 26 is connected to the vehicle body side, if the rear end of the first link 25 rises up, the first link 25 swings with the third connecting shaft 33 as a center so as to cause the front end to move downwardly.

Accordingly, while the upper end of the shock absorber 23 is pressed down by the front end of the first link 25, the lower end of the shock absorber 23 is pushed upwardly by the lower bracket 28. In this way, the shock absorber 23 is compressed in a direction causing the upper and lower ends to come together, that is, in a stroke direction. Thus, a load is absorbed by attenuation using the damper 45 and by the suspension spring 46.

At this time, the first connecting shaft 31 constitutes a swing center of the first link 25 and the third connecting shaft 33 constitutes a power point of the swing. Also, the first axis 25A connecting the centers of the first connecting shaft 31 and the third connecting shaft 33 constitutes a swing radius of the swing. The third connecting shaft 33 is therefore pulled towards the vehicle body side by the second link 26 with the angle R formed by the second axis 26A connecting the respective centers of the third connecting shaft 33 of the second link 26 and the fourth connecting shaft 34, and the first axis 25A, which is the swing radius, is an obtuse angle in the state where the shock absorber 23 is at the maximum compression position. Specifically, the angle R formed by the two axes 25A and 26A is set so as to pass through 90° while the shock absorber 23 reaches from the maximum extension position to the maximum compression position.

This means that the second link 26 always pulls the power point of the first link 25 at an angle of about 90° with respect to the swing radius of the first link 25, and it is possible to keep the tension load applied to the second link 26 when the first link 25 is caused to swing to a minimum.

Figure 4:
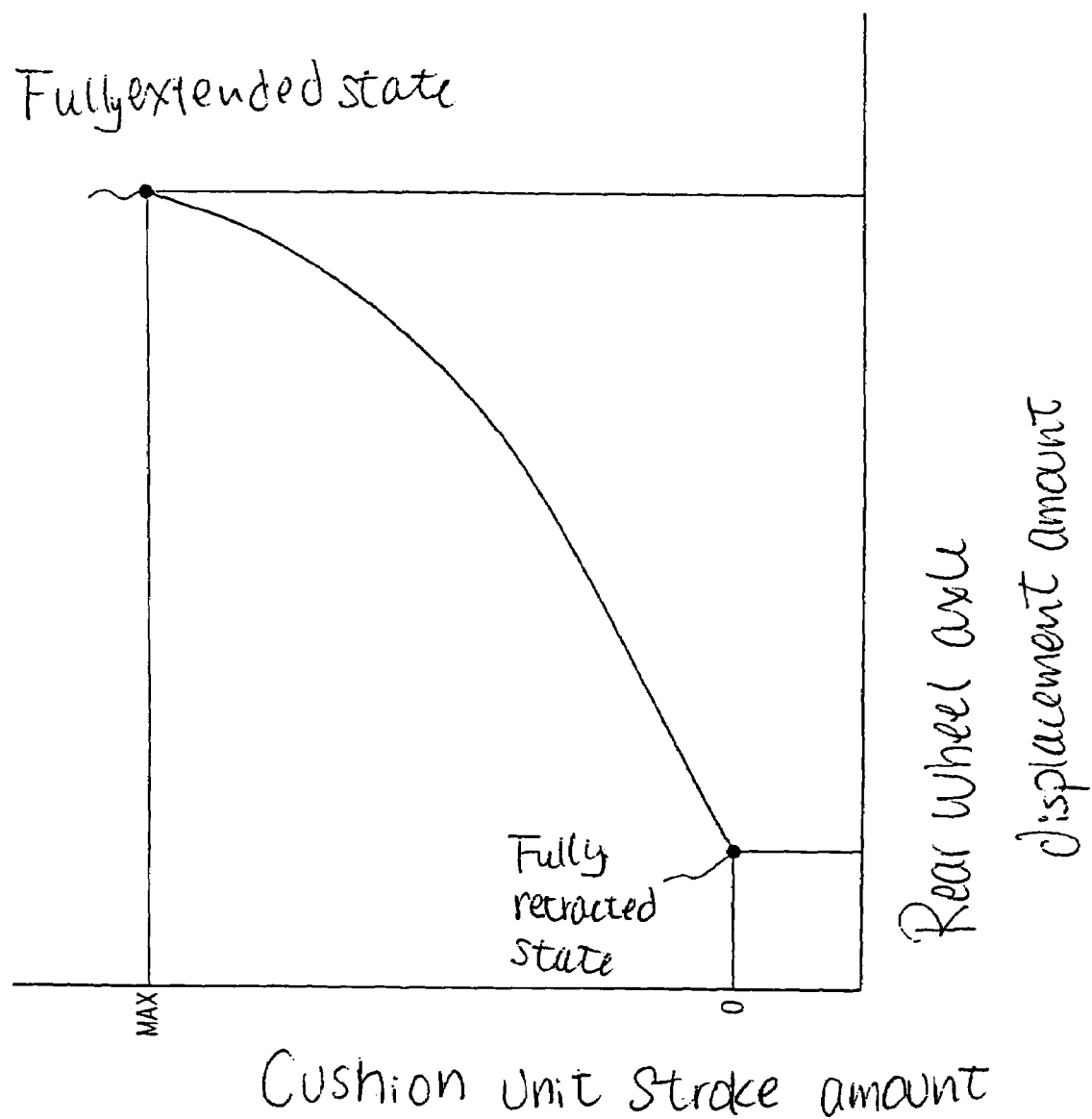
FIG. 4 is a graph showing a relationship between the stroke amount of the shock absorber and displacement amount of a rear wheel axle.

FIG. 4 is a graph showing a relationship between the displacement amount of the rear wheel axle 15 and stroke amount of the shock absorber 23, for the swingarm suspension system 20. The vertical axis represents a stroke of the shock absorber 23 and the horizontal axis represents the amount of displacement of the rear wheel axle 15. As shown in FIG. 4, when the rear wheel axle 15 starts to move from the state where the shock absorber 23 is at the fully extended position, fully extended state, the stroke of the shock absorber 23 increases substantially linearly accompanying an increase in amount of displacement of the rear wheel axle 15. If the amount of displacement of the rear wheel axle 15 is increased further and the state where the shock absorber 23 is at the fully compressed position, fully retracted state, is approached, the ratio of the increase in the stroke of the shock absorber 23 in accordance with an increase in the displacement amount of the rear wheel axle 15 gradually becomes larger. Specifically, with this swingarm suspension system 20, accompanying upward displacement of the rear wheel axle 15 the stroke amount of the shock absorber 23 gradually increases. That is, the stroke speed of the shock absorber 23 increases. In this way, when the amount of compression of the shock absorber 23 is slight the damping force is decreased to give a good riding feeling, and in the vicinity of the position where the shock absorber 23 is at a maximum compression the damping force is increased to prevent the shock absorber 23 from bottoming out.

According to the above described embodiment, since the angle R formed by the first axis 25A, constituting the swing radius of the first link 25, and the second axis 26A, running in the direction of tension of the second link 26, is set so as to pass through 90° while the shock absorber 23 reaches from the maximum extension position to the maximum compression position, the second link 26 always pulls the first link 25 at an angle of about 90° with respect to the swing radius of the first link 25. Thus, it is possible to minimize the load applied on the second link 26 when the first link 25 is caused to swing. This means that together with it being possible to reduce the weight using an optimum design for the link mechanism 24, the swingarm 21 connecting to the link mechanism 24 and the pivot plate 13 can be similarly reduced in weight. More particularly, by providing the second link 26 from below the pivot shaft 14 to above the swingarm 21, since this leads to large scale parts compared to the case where the link mechanism is arranged below the swingarm 21, this lightening of the load applied to the second link 26 is effective in lightening of the link mechanism 24.

Also, by attaching the second link 26 to a section of the pivot plate 13 lower down relative to the pivot shaft 14, a cross member or the like from the vicinity of the center of the vehicle above the pivot shaft 14 is no longer necessary. Thus, it is possible to arrange electrical components, such as a battery, control unit etc., and other equipment such as a tool box collectively in the vicinity of the center of the vehicle.

Here, by providing the first connecting shaft 31, which is a rotation shaft of the swingarm 21 and the first link 25, at a position overlapping the swingarm 21 when viewed from the side, the position of the link mechanism 24, and more particularly the first link 25, is lowered. Thus, in addition to making it possible to increase the degree of freedom of arranging the electrical components due to a widening of a space in the vicinity of the center of the vehicle above the pivot shaft 14, it is possible to reduce the weight and shorten the length of the second link 26.

Further, by providing the reinforcement frames 38 at a lower part of the arm members 37 of the swingarm 21, it is possible to ensure an even wider space in the vicinity of the center of the vehicle above the pivot shaft 14, and it is possible to further increase the degree of freedom in arranging electrical components. Also, by keeping the upper surface height of the swingarm 21 low, the second and third connecting shafts 32 and 33, which are respective rotation shafts for the first link 25 with the second link 26 and the shock absorber 23, become positioned above the swingarm 21 when viewed from the side. Thus, it is possible to improve the ease of assembly of the link mechanism 24 and the shock absorber 23, and to improve the maintenance of the assembly. Still further, since together with arranging the shock absorber 23 in a substantially upright attitude the second link 26 is arranged almost completely to overlap the shock absorber 23 when viewed from the side. Thus, it is possible to curb the longitudinal length of the arrangement space for these components, and to shorten the wheel base.

A second embodiment of a swingarm suspension system of the present invention will be described with reference to FIG. 5 and FIG. 6. The swingarm suspension system 120 shown in FIG. 5 and FIG. 6 has a front end of a first link 125 that is connected using a first connecting shaft 31 to an upper bracket 127 provided on an upper part of a swingarm 21. A rear end of the first link 125 is connected to an upper end part of a shock absorber 23 using a second connecting shaft 32. In addition, a second link 26, the shock absorber 23, a cross member 40 and a lower bracket 28 are provided. In this case, if the swingarm 21 moves upwardly, the first link 125 moves with the third connecting shaft 33 as a center so that the rear end moves downwardly, and the upper end section of the shock absorber 23 is pushed down. Parts that are the same as those in the above-described first embodiment have the same reference numerals attached thereto, and description is omitted.

Figure 5:
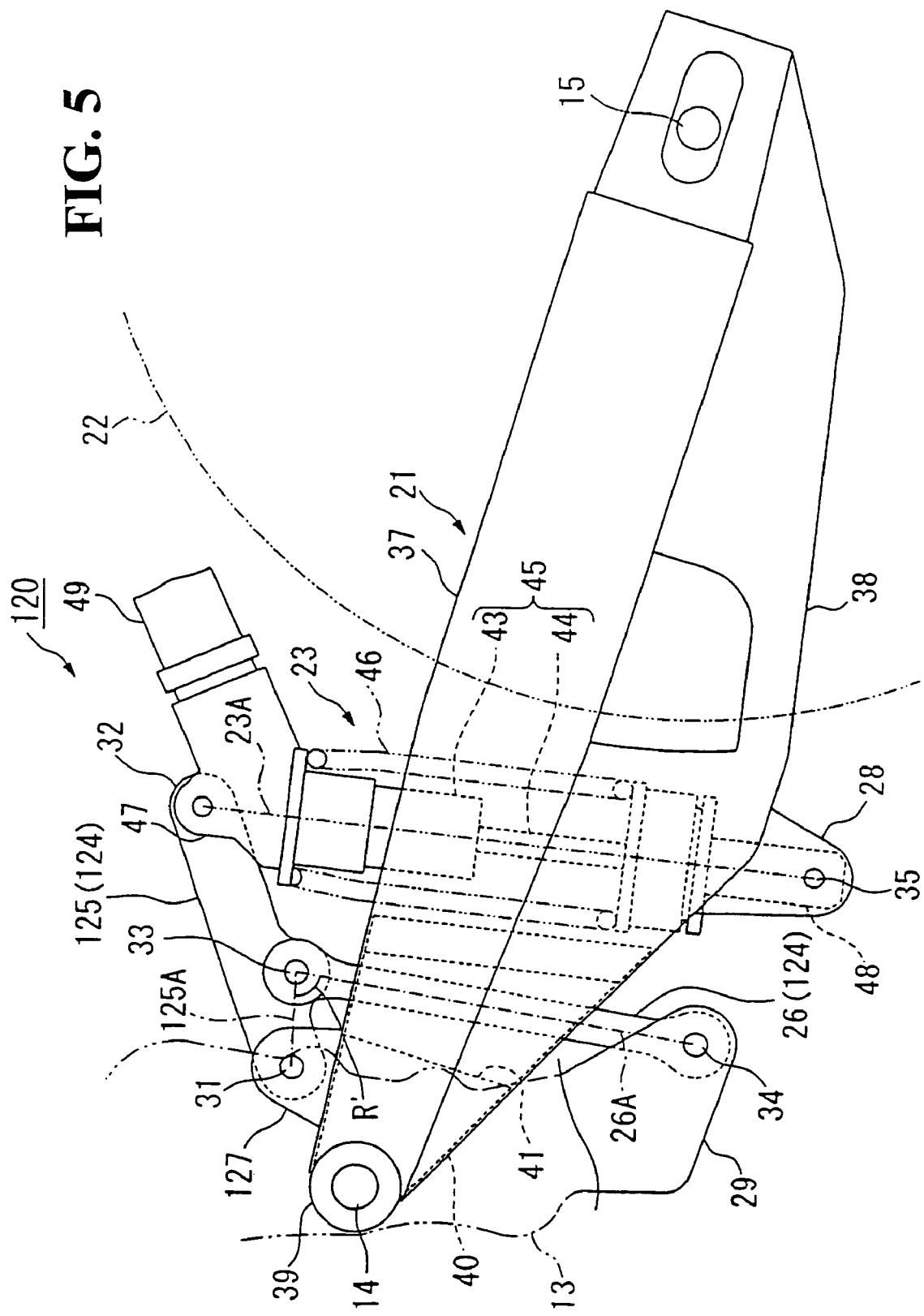
FIG. 5 is a side elevation of a swingarm suspension system according to a second embodiment.
Figure 6:
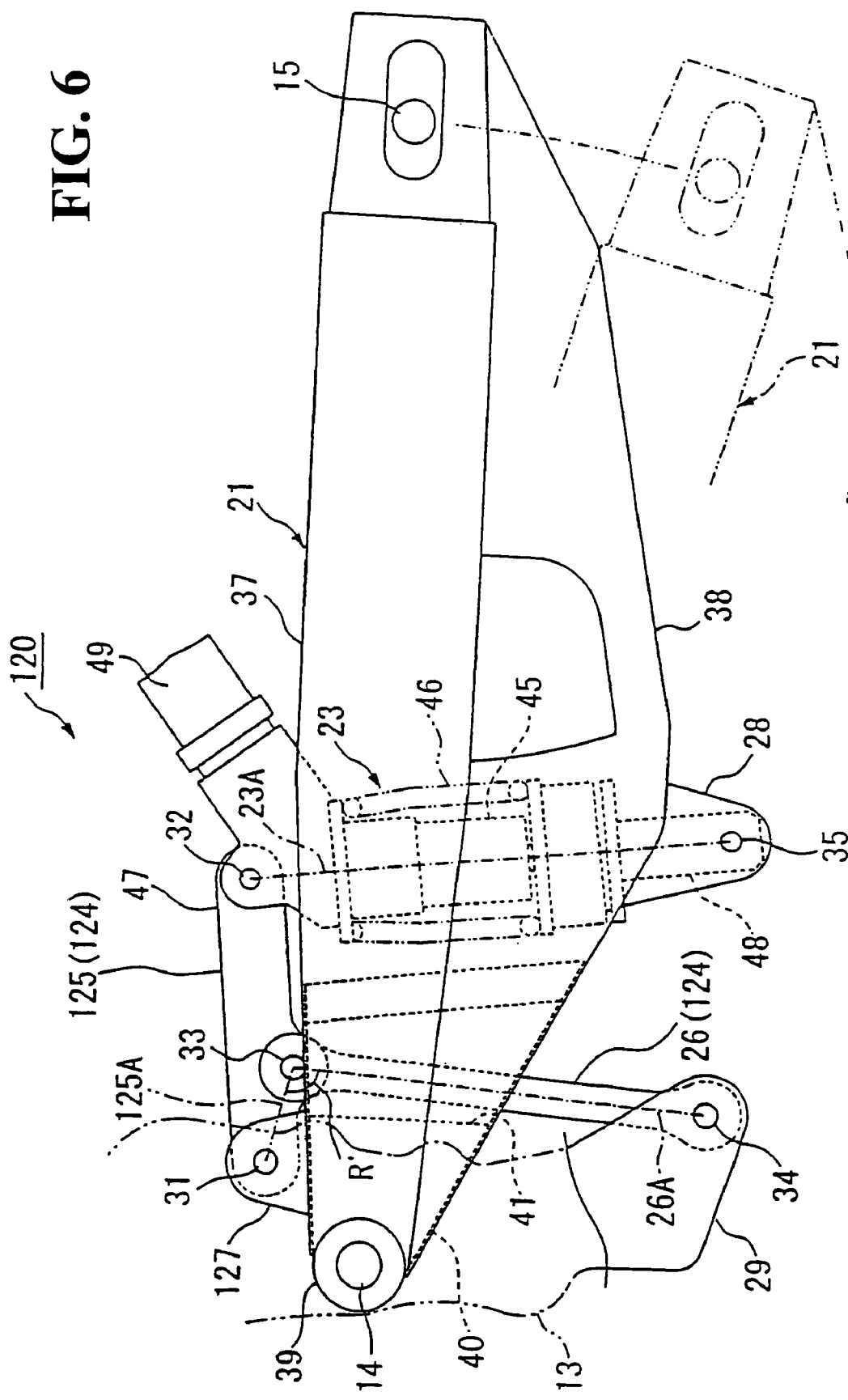
FIG. 6 is a side elevation showing the swingarm suspension system of FIG. 5 with a shock absorber in a fully retracted state.

FIG. 5 shows a state where the shock absorber 23 is at a maximum extension position. In this state an angle R' is formed as an acute angle by a first axis 125A, connecting respective centers of first and third connecting shafts 31 and 33 of the first link 125, and a second axis 26A connecting respective centers of third and fourth connecting shafts 33 and 34 of the second link 26. As shown in FIG. 6, in a state where the shock absorber 23 is at a maximum compression position, the angle R' is an obtuse angle. That is, as with the above describe embodiment, the angle R' formed by each of the axes 125A and 26A is set so as to pass through 90° while the shock absorber 23 reaches from the maximum extension position to the maximum compression position. In this way, as with the above described first embodiment, it is possible to reduce the weight by using an optimum design for the link mechanism 124. Also, with this embodiment, although the upper bracket 127 projecting upwardly from the upper surface of the swingarm 21 is provided as a connecting section for the first link 125, it is also possible to provide this upper bracket 127 at a lower position than the upper surface of the swingarm 21, like the connecting section 27, to provide the first connecting shaft 31 at a position overlapping the swingarm 21 when viewed from the side.

The present invention is not limited to the above-described embodiments, and, for example, it is possible to provide the pivot shaft and the link attachment section at a rear section of the power unit 8, and to respectively attach the swingarm 21 and the second link 26 to the pivot shaft and the link attachment section. It is also possible to attach the swingarm 21 and the second link 26 to at least one of the vehicle frame 5, pivot plate 13, and the power unit 8. At this time, the pivot plate 13 can also be separate from the vehicle frame 5. The structure of the above described embodiments is one example, and obviously various changes are possible within the range of the claims without departing from the spirit of the present invention.

As has been described above, according to the present invention, since an angle formed by a first axis, constituting a swing radius of a first link, and a second axis running in a direction of tension of a second link is set so as to pass through 90° while a shock absorber is reaching from a maximum extension position to a maximum compression position, it is possible to minimize a load applied to the second link when the first link is caused to swing. Thus, it is possible to reduce the weight using an optimum design for a link mechanism, and it is possible to similarly reduce the weight of the swingarm connected to the link mechanism and the vehicle body side.

According to the present invention, it is possible to ensure a wide space in the vicinity of the center of the vehicle above a pivot shaft by lowering the position of the first link, and it is possible to increase the degree of freedom in arranging equipment such as electrical components. It is also possible to shorten the length of the second link by lowering the position of the first link. This arrangement also contributes to a reduction in the weight of the link mechanism.

According to the present invention, by providing reinforcement frames below the arm members of the swingarm it is possible to ensure a much wider space above the arm members. Thus, it is possible to increase the degree of freedom in arranging equipment such as electrical components. Also, by keeping the swingarm upper surface height low, respective connecting sections for the first link with the second link and the shock absorber are positioned above the swingarm, and it is possible to improve the ease of assembly of the link mechanism and the shock absorber, and to improve the maintenance of the assembly.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A swingarm suspension system for a vehicle comprising:
   a swingarm having one end swingably attached to a pivot shaft provided on a vehicle body side and a vehicle wheel attached to another end;
   a shock absorber having a lower end attached to a lower part of the swingarm; a first link rotatably attached to an upper end of the shock absorber and an upper part of the swingarm; and
   a second link rotatably attached to part of the vehicle body side lower down than the pivot shaft and the first link;
   wherein an angle formed by a first axis, connecting respective centers of a rotational shaft of the first link and the swing arm and a rotational shaft of the first link and the second link, and a second axis, connecting respective centers of a rotational shaft of the first link and the second link and a rotational shaft of the second link and the vehicle body side, is set so as to pass through 90° while the shock absorber reaches from a maximum extension position to a maximum compression position, and wherein the rotational shaft connecting the first and second links is provided at a position overlapping the swingarm as viewed from a side of the vehicle, when the shock absorber is at a maximum compression position.

2. A swingarm suspension system for a vehicle comprising:
- a swingarm having one end swingably attached to a pivot shaft provided on a vehicle body side and a vehicle wheel attached to another end;
- a shock absorber having a lower end attached to a lower part of the swingarm;
- a first link rotatably attached to an upper end of the shock absorber and an upper part of the swingarm; and
- a second link rotatably attached to part of the vehicle body side lower down than the pivot shaft and the first link;

wherein an angle formed by a first axis, connecting respective centers of a rotational shaft of the first link and the swing arm and a rotational shaft of the first link and the second link, and a second axis, connecting respective centers of a rotational shaft of the first link and the second link and a rotational shaft of the second link and the vehicle body side, is set so as to pass through 90° while the shock absorber reaches from a maximum extension position to a maximum compression position, and wherein the first and second links are provided in front of the shock absorber.

* * * * *